(12) United States Patent
Mori et al.

(10) Patent No.: US 12,230,748 B2
(45) Date of Patent: Feb. 18, 2025

(54) METHOD OF MANUFACTURING ADHERED COMPONENTS

(71) Applicant: TOYOTA JIDOSHA KABUSHIKI KAISHA, Toyota (JP)

(72) Inventors: Shinichiro Mori, Okazaki (JP); Ryota Aoki, Okazaki (JP); Hiroyasu Kado, Seto (JP); Hiroya Takeuchi, Toyota (JP); Yuuki Yamazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 455 days.

(21) Appl. No.: 17/854,346

(22) Filed: Jun. 30, 2022

(65) Prior Publication Data
US 2023/0038777 A1 Feb. 9, 2023

(30) Foreign Application Priority Data
Aug. 3, 2021 (JP) ................................. 2021-127426

(51) Int. Cl.
*H01M 10/04* (2006.01)
*H01M 10/613* (2014.01)
(52) U.S. Cl.
CPC ......... *H01M 10/04* (2013.01); *H01M 10/613* (2015.04)
(58) Field of Classification Search
CPC ............. H01M 10/04; H01M 10/613; H01M 2220/20; H01M 10/625; H01M 10/647; H01M 10/653; H01M 10/6554; H01M 10/6556; H01M 10/6568; H01M 50/209; Y02E 60/10; F16B 11/006
See application file for complete search history.

(56) References Cited

U.S. PATENT DOCUMENTS 6,174,406 B1 * 1/2001 Gaynes ................. F16B 11/006
156/295
9,592,656 B1 * 3/2017 Davies ................ B32B 37/1292

FOREIGN PATENT DOCUMENTS

JP 2019-119147 A 7/2019

* cited by examiner

*Primary Examiner* — George R Koch
*Assistant Examiner* — Christopher C Caillouet
(74) *Attorney, Agent, or Firm* — Sughrue Mion, PLLC

(57) ABSTRACT

A method of manufacturing adhered components includes a process of applying adhesive to application areas on a surface of a first component, a process of placing a second component above the first component, and a process of pressurizing the second component toward the first component. In the pressurization process, the load applied to a pressurizer changes while sequentially undergoing a curvilinear increase period in which the load increases in a curved line as the compression amount of the adhesive increases, and a rapid increase period in which the load increases in a polygonal line with respect to the trajectory of the load in the curvilinear increase period as the compression amount increases. During pressurization by the pressurizer, the load is detected by a load sensor, the rapid increase period is detected based on the detection value of the load sensor, and the pressurization is stopped during the rapid increase period.

9 Claims, 7 Drawing Sheets

METHOD OF MANUFACTURING ADHERED COMPONENTS

CROSS-REFERENCE TO RELATED APPLICATION

This application claims priority to Japanese Patent Application No. 2021-127426 filed on Aug. 3, 2021, incorporated herein by reference in its entirety.

BACKGROUND

1. Technical Field

The technology disclosed in the specification relates to a method of manufacturing adhered components.

2. Description of Related Art

Japanese Unexamined Patent Application Publication No. 2019-119147 (JP 2019-119147 A) discloses a technology for bonding two components with an adhesive. In this technology, initially, the adhesive is applied in the form of beads to two or more locations on a surface of a first component. Then, a second component is placed above the first component so that the adhesive is sandwiched between the first component and the second component. Then, a pressurization process of pressurizing the second component toward the first component is performed. When the pressurization process is performed, the adhesive is compressed and expanded in the lateral direction. The expanded adhesives are connected to each other, so that the adhesive is applied to a wide area. Thus, in this technology, the adhesive is distributed and applied to two or more locations, and then the adhesives at the locations are compressed and expanded, to be connected to each other. According to this technology, the adhesive can be applied to a wide area, using a relatively low load as the load of the pressurization process. Accordingly, it is possible to apply the adhesive to a wide area, without applying a high load to the first component and the second component. Then, the adhesive is cured, so that the first component and the second component are bonded to each other.

SUMMARY

In the technology of JP 2019-119147 A, it is difficult to grasp the expanded area of the adhesive in the pressurization process. Thus, in the pressurization process, the adhesives applied to the two or more locations may not be connected to each other. When the adhesives are not connected to each other, and a gap exists between the adhesives, the adhesive strength is reduced. In the technology for applying adhesives to two or more locations and then performing a pressurization process, a technology for surely connecting the adhesives to each other during the pressurization process is proposed in this specification.

A first method of manufacturing adhered components disclosed in the specification has an application process, a component placement process, and a pressurization process. In the application process, an adhesive is applied to a plurality of application areas extending linearly and spaced in a direction intersecting an extending direction in which the application areas extend linearly, on a surface of a first component. In the component placement process, a second component is placed above the first component such that the adhesive is sandwiched between the first component and the second component. In the pressurization process, a pressurizer pressurizes the second component toward the first component, to compress the adhesive. In the pressurization process, a load applied to the pressurizer changes such that the load goes through a curvilinear increase period in which the load increases in a curved line as an amount of compression of the adhesive increases, and a rapid increase period in which the load increases in a polygonal line with respect to a trajectory of the load in the curvilinear increase period as the amount of compression of the adhesive increases, in the order of description. The pressurization process includes performing pressurization by the pressurizer while detecting the load by a load sensor, detecting the rapid increase period based on a detection value of the load sensor, and stopping the pressurization by the pressurizer during the rapid increase period.

In the manufacturing method, after the adhesive is applied to the application areas of the first component, and the second component is placed such that the adhesive is sandwiched between the first component and the second component, the pressurization process is performed. In the pressurization process, the pressurizer pressurizes the second component toward the first component to compress the adhesive, so that the adhesive expands in the lateral direction. While the adhesives on the application areas are not connected to each other, the load applied to the pressurizer increases in a curved line as the amount of compression of the adhesive increases. Namely, the period in which the adhesives are not connected to each other corresponds to the curvilinear increase period. Then, once the adhesives are connected to each other due to expansion of the adhesives, the adhesive is less likely or unlikely to flow in the lateral direction in an area where the adhesives are connected to each other. Thus, the adhesive is less likely or unlikely to be compressed, and the load applied to the pressurizer rapidly increases. At this time, the load applied to the pressurizer increases in a polygonal line with respect to the trajectory of the load in the curvilinear increase period. Namely, the period after the time when the adhesives are connected to each other corresponds to the rapid increase period. In this manufacturing method, the pressurizer performs pressurization while the load applied to the pressurizer is detected by the load sensor, the rapid increase period is detected based on the detection value of the load sensor, and the pressurization by the pressurizer is stopped during the rapid increase period. Accordingly, the pressurization can be stopped in a condition where the adhesives are connected to each other. Namely, according to the manufacturing method, the adhesives can be surely connected to each other during the pressurization process.

A second method of manufacturing adhered components disclosed in the specification has an application process, a component placement process, and a pressurization process. In the application process, an adhesive is applied to a plurality of application areas extending linearly and spaced in a direction intersecting an extending direction in which the application areas extend linearly, on a surface of a first component. In the component placement process, a second component is placed above the first component such that the adhesive is sandwiched between the first component and the second component. In the pressurization process, a pressurizer pressurizes the second component toward the first component, to compress the adhesive. In the pressurization process, a compression speed of the adhesive changes such that the compression speed goes through a curvilinear decrease period in which the compression speed decreases in a curved line as an amount of compression of the adhesive increases, and a rapid decrease period in which the compression speed decreases in a polygonal line with respect to a trajectory of the compression speed in the curvilinear increase period as the amount of compression of the adhesive increases, in the order of description. The pressurization process includes performing pressurization by the pressurizer while detecting the compression speed by a compression speed sensor, detecting the rapid decrease period based on a detection value of the compression speed sensor, and stopping the pressurization by the pressurizer during the rapid decrease period.

In the manufacturing method, after the adhesive is applied to the application areas of the first component, and the second component is placed such that the adhesive is sandwiched between the first component and the second component, the pressurization process is performed. In the pressurization process, the pressurizer pressurizes the second component toward the first component to compresses the adhesive, so that the adhesive expands in the lateral direction. While the adhesives on the application areas are not connected to each other, the compression speed of the adhesive decreases in a curved line as the amount of compression of the adhesive increases. Namely, the period in which the adhesives are not connected to each other corresponds to the curvilinear decrease period. Then, once the adhesives are connected to each other due to expansion of the adhesives, the adhesive is less likely or unlikely to flow in the lateral direction in an area where the adhesives are connected to each other. Thus, the adhesive is less likely or unlikely to be compressed, and the compression speed of the adhesive rapidly decreases. At this time, the compression speed of the adhesive decreases in a polygonal line with respect to the trajectory of the compression speed in the curvilinear decrease period. Namely, the period after the time when the adhesives are connected to each other corresponds to the rapid decrease period. In the manufacturing method, the pressurizer performs pressurization while the compression speed of the adhesive is detected by the compression speed sensor, the rapid decrease period is detected based on the detection value of the compression speed sensor, and the pressurization by the pressurizer is stopped during the rapid decrease period. Accordingly, the pressurization can be stopped in a condition where the adhesives are connected to each other. Namely, according to the manufacturing method, the adhesives can be surely connected to each other during the pressurization process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one example of the first manufacturing method described above, in the pressurization process, the pressurization by the pressurizer may be stopped when the detection value of the load sensor reaches a threshold value. The threshold value may be set to a value of the load during the rapid increase period.

With this arrangement, the pressurization by the pressurizer can be stopped during the rapid increase period.

In one example of the first manufacturing method described above, the adhesive may have thixotropic properties.

With this arrangement, the viscosity of the adhesive increases when the adhesives are connected to each other; therefore, the load applied to the pressurizer rises more sharply during the rapid increase period. Accordingly, the rapid increase period can be easily detected.

In one example of the first manufacturing method described above, the first component may be a battery pack, and the second component may be a cooler.

In one example of the first manufacturing method described above, the stiffness of one of the first component and the second component may be lower than the stiffness of the other of the first component and the second component.

With this arrangement, when the component having the higher stiffness is distorted, the component having the lower stiffness can deform according to the distortion. Accordingly, the components are likely to be more properly bonded together.

In one example of the first manufacturing method described above, ceramic powder may be dispersed in the adhesive.

With this arrangement, the thermal conductivity of the adhesive can be improved.

In the following description, a method of manufacturing a module of a battery pack for an electrified vehicle and a cooler, by bonding the cooler to the battery pack.

First Embodiment

In a manufacturing method of a first embodiment, an adhesive application process, a component placement process, and a pressurization process are carried out in this order.

Figure 1:
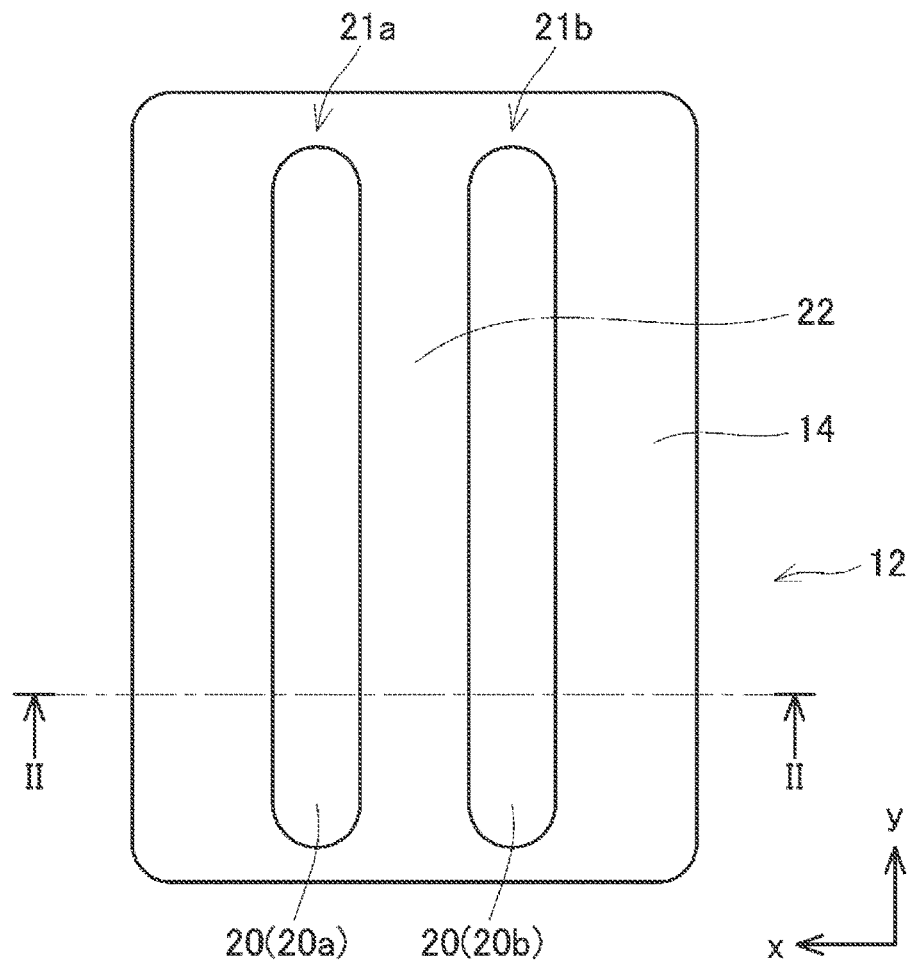
FIG. 1 is a plan view showing an application process.
Figure 2:
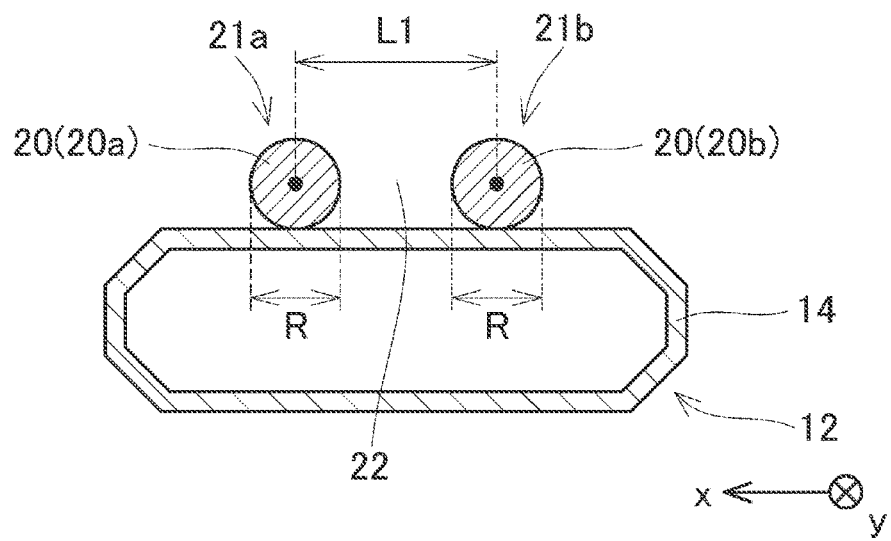
FIG. 2 is a cross-sectional view showing the application process (a cross-sectional view taken along line II-II in FIG. 1)

In the adhesive application process, adhesive 20 is applied to a surface of a case 14 of a battery pack 12, as shown in FIG. 1. The adhesive 20 is applied to two application areas 21*a*, 21*b* that are spaced apart from each other in the x direction. The adhesive 20 is applied such that the adhesive 20 extends in a straight line in the y direction (i.e., the direction perpendicular to the x direction) in each of the application areas 21*a*, 21*b*. As shown in FIG. 2, the adhesive 20 is applied such that the cross-sectional shape of the adhesive 20 is a generally circular shape. The adhesive 20 is jelly-like and has thixotropic properties. In this specification, the thixotropic properties mean properties where the viscosity decreases in a condition where shear stress is applied, and the viscosity gradually increases in static conditions. Also, ceramic powder is dispersed within the adhesive 20. In the following description, the adhesive 20 in the application area 21*a* may be referred to as "adhesive 20*a*", and the adhesive 20 in the application area 21*b* may be referred to as "adhesive 20*b*". In the conditions of FIG. 1 and FIG. 2, there is a gap 22 between the adhesive 20*a* and the adhesive 20*b*.

Figure 3:
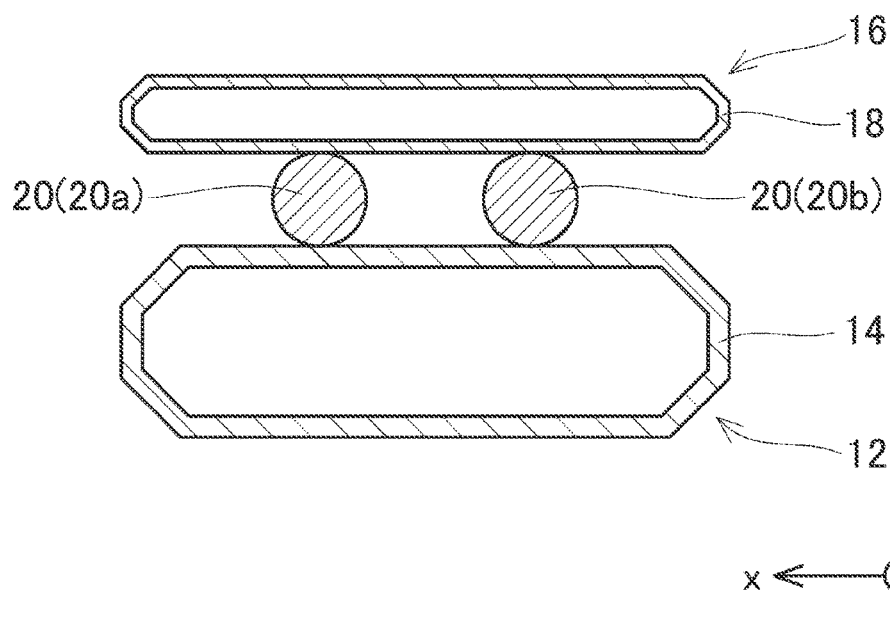
FIG. 3 is a cross-sectional view showing a component placement process.

Then, in the component placement process, the cooler 16 is placed above the battery pack 12, as shown in FIG. 3. The cooler 16 is placed above the battery pack 12, such that the adhesive 20 is sandwiched between the case 14 of the battery pack 12 and an outer wall 18 of the cooler 16. The stiffness of the case 14 of the battery pack 12 is higher than that of the outer wall 18 of the cooler 16.

Figure 4:
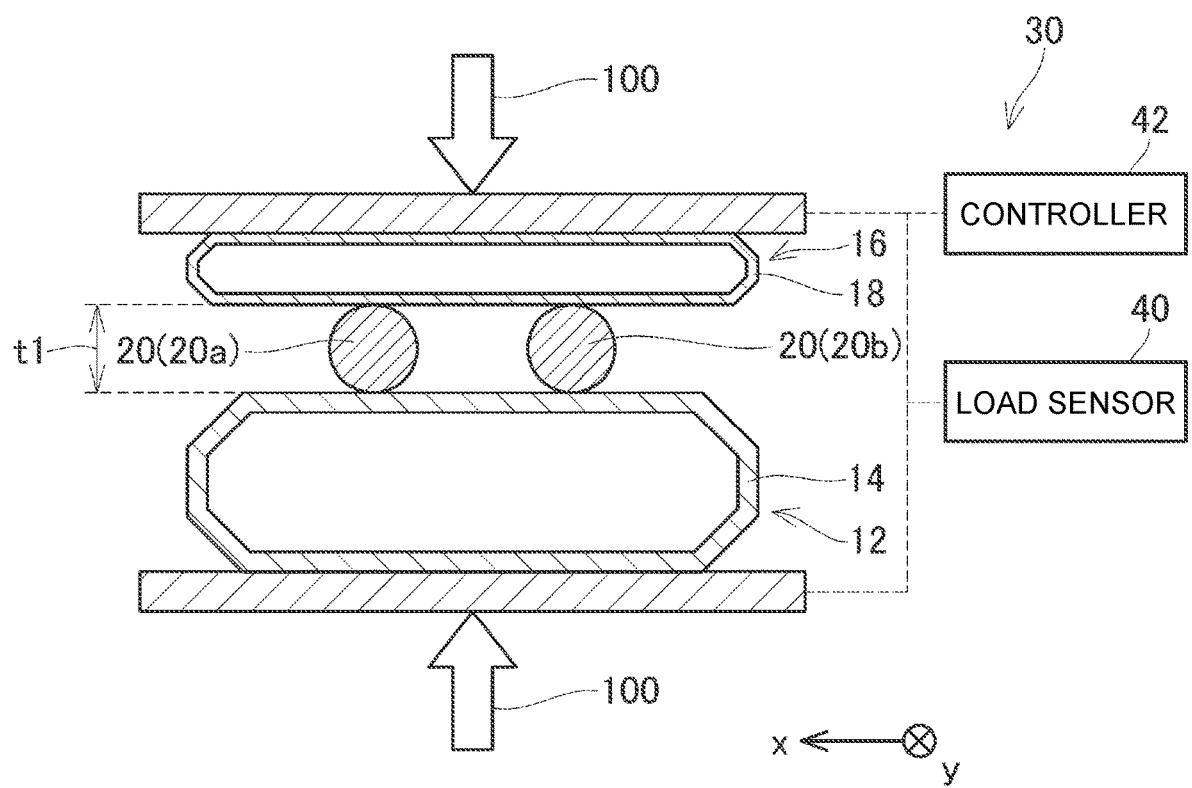
FIG. 4 is a cross-sectional view showing a compression process.
Figure 5:
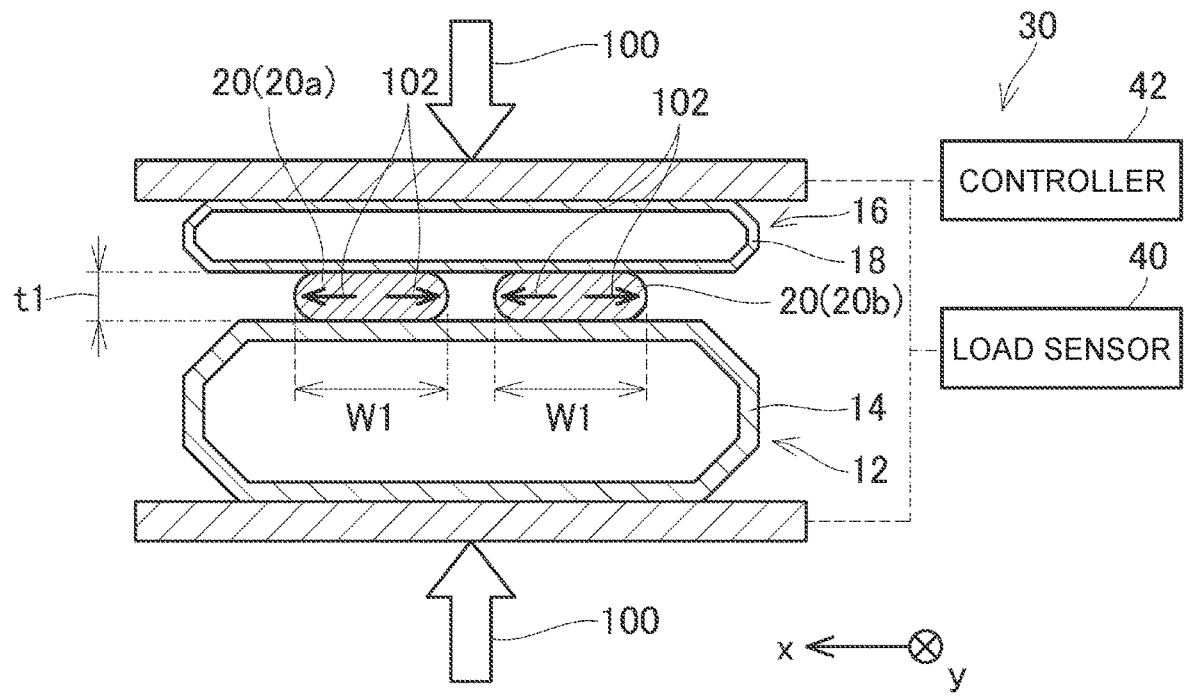
FIG. 5 is a cross-sectional view showing the compression process.
Figure 6:
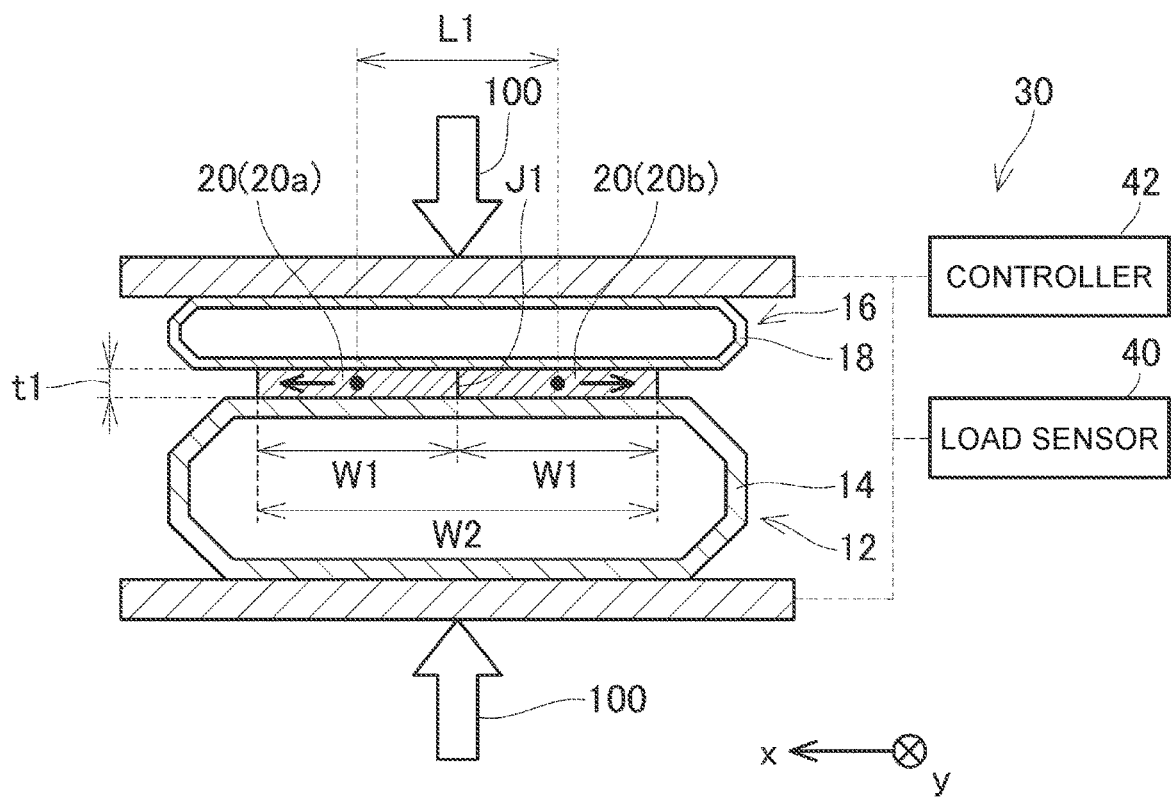
FIG. 6 is a cross-sectional view showing the compression process.
Figure 7:
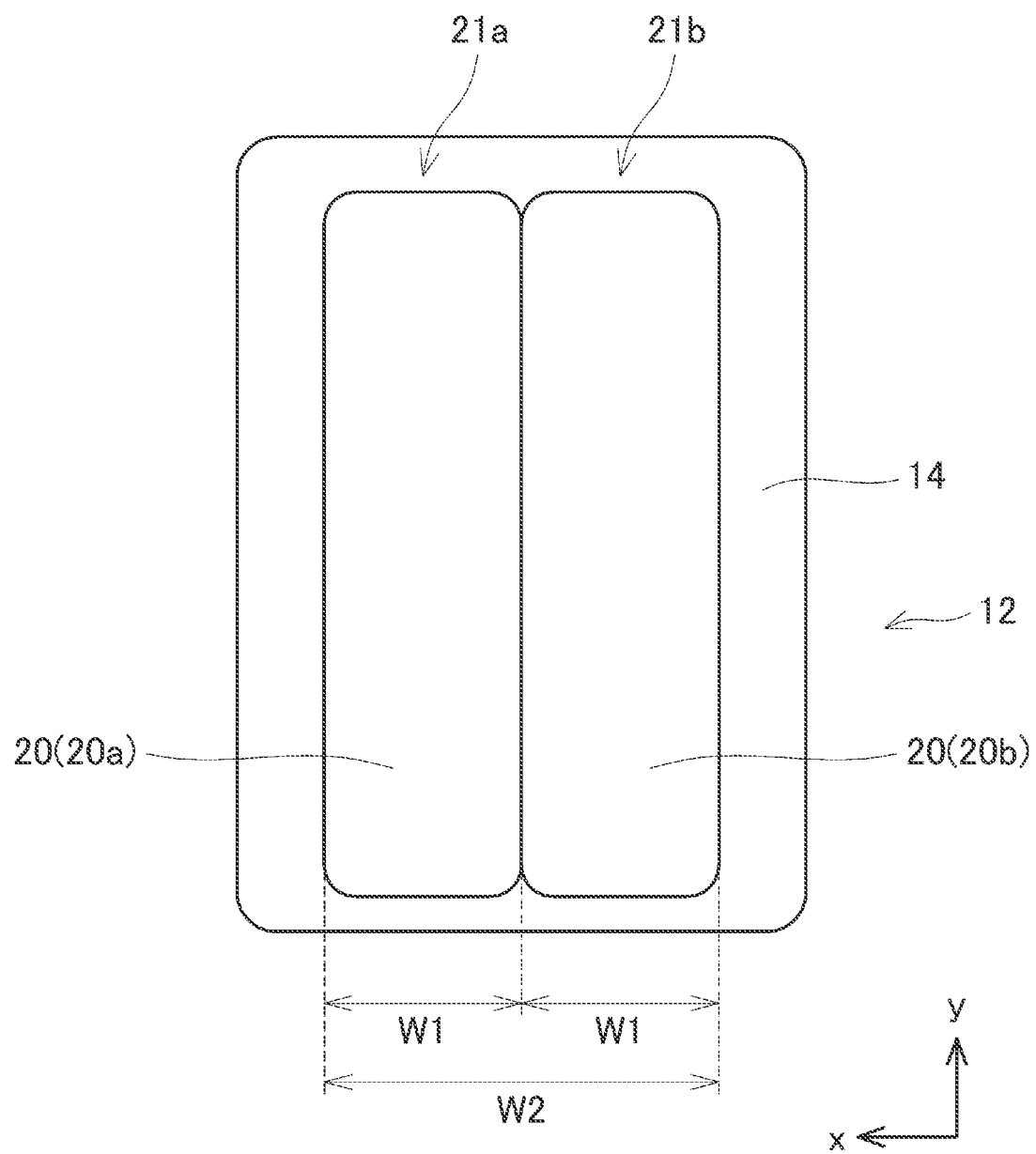
FIG. 7 is a plan view showing the compression process.

Then, the pressurization process is carried out. In the pressurization process, the cooler 16 is pressurized toward the battery pack 12 by the pressurizer 30 as indicated by arrows 100 in FIG. 4. As a result, the adhesive 20 is compressed. Namely, the thickness t1 of the adhesive 20 is reduced. As shown in FIG. 4, the pressurizer 30 has a load sensor 40 and a controller 42. The load sensor 40 detects the load N1 applied to the pressurizer 30 (namely, the load applied to the adhesive 20). The controller 42 controls the pressurizer 30 according to the detection value of the load sensor 40. In the pressurization process, the adhesive 20 is compressed while the load N1 applied to the pressurizer 30 is detected by the load sensor 40. As the adhesive 20 is compressed, the adhesive 20 flows in the x direction as indicated by arrows 102 in FIG. 5. As a result, the width W1 of the adhesives 20*a*, 20*b* expands. As the adhesive 20 is further compressed from the state of FIG. 5, the width W1 of the adhesives 20*a*, 20*b* further expands, and the adhesive 20*a* and the adhesive 20*b* contact with each other, as shown in FIG. 6 and FIG. 7. In this manner, the adhesive 20*a* and the adhesive 20*b* are connected to each other, so that the adhesive 20 is spread over the entire major area of the surface of the case 14 (i.e., the area having the width W2 in FIG. 6 and FIG. 7).

In the pressurization process, the pressurizer 30 compresses the adhesive 20 in such a manner that the load N1 applied to the pressurizer 30 (i.e., the load applied to the adhesive 20) can be changed. For example, the pressurizer 30 compresses the adhesive 20 at a constant work rate or at a constant compression speed. Thus, during the pressurization process, the load N1 applied to the pressurizer 30 changes.

Figure 8:
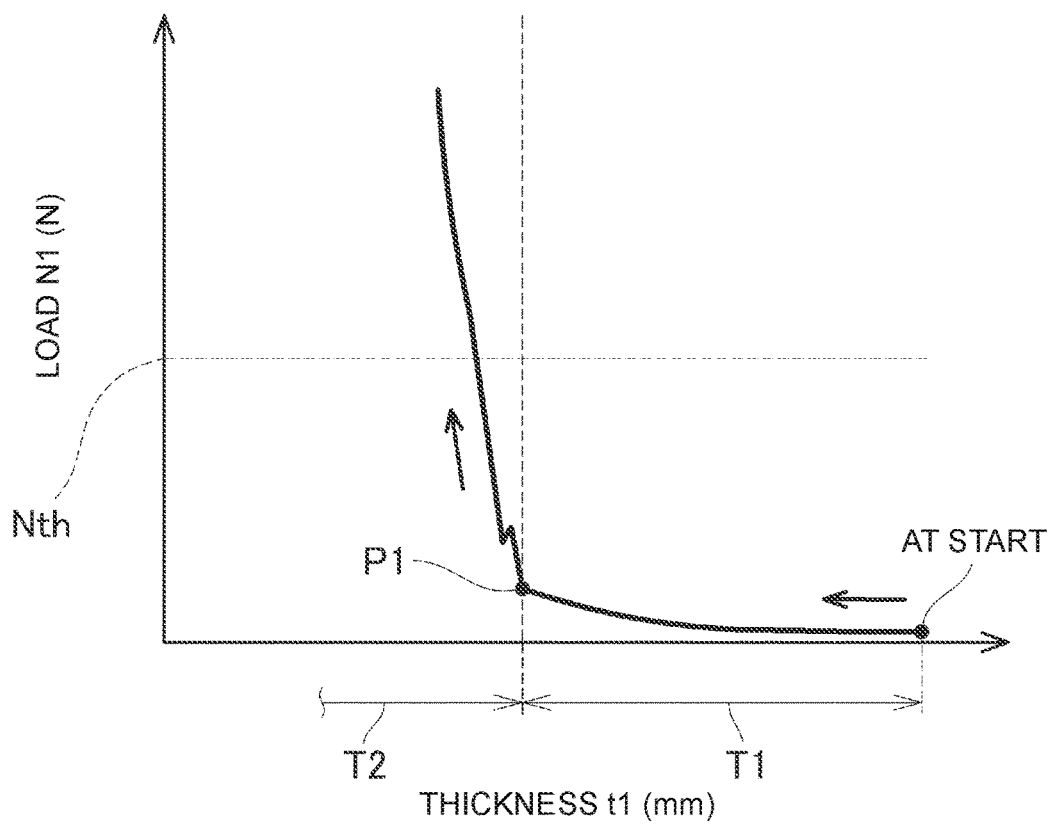
FIG. 8 is a graph showing changes in the load in the compression process.

FIG. 8 shows changes in the load N1 applied to the pressurizer 30 during the pressurization process. As shown in FIG. 8, the load N1 applied to the pressurizer 30 at the start of the pressurization process is low. Immediately after the start of the pressurization process, the adhesive 20*a* and the adhesive 20*b* are separated from each other as shown in FIG. 4 and FIG. 5. In this condition, as the width W1 of each adhesive 20*a*, 20*b* expands, the load required to expand the width W1 increases. Thus, as shown in FIG. 8, immediately after the start of the pressurization process, the load N1 applied to the pressurizer 30 increases slowly in a curved line as the thickness t1 of the adhesive 20 decreases. Then, when the adhesive 20*a* and the adhesive 20*b* contact with each other as shown in FIG. 6, the adhesives 20*a*, 20*b* become unable to flow in the x direction at the contact position J1. Thus, after that, the load required to expand the width W2 of the adhesive 20 rapidly increases. As a result, as shown in FIG. 8, the load N1 applied to the pressurizer 30 rises rapidly from the bending point P1. In the first embodiment, in particular, the adhesive 20 has the thixotropic properties. Thus, when the adhesive 20 stops flowing in the x direction at the contact position J1, the viscosity of the adhesive 20 increases at around the contact position J1. Thus, the load N1 applied to the pressurizer 30 rises extremely steeply from the bending point P1. In the following description, the period in which the load N1 increases slowly in a curved line will be referred to as "curvilinear increase period T1", and the period in which the load N1 increases rapidly will be referred to "rapid increase period T2". In the rapid increase period T2, the load N1 increases at a higher rate of increase than the rate of increase of the load N1 in the curvilinear increase period T1. In the rapid increase period T2, the load N1 increases in a polygonal line with respect to the trajectory of the load N1 in the curvilinear increase period T1. Namely, at the bending point P1, the load N1 changes in an indifferentiable manner. As described above, the adhesive 20*a* and the adhesive 20*b* are separated from each other during the curvilinear increase period T1, and the adhesive 20*a* and the adhesive 20*b* are connected to each other during the rapid increase period T2.

During the pressurization process, the controller 42 of the pressurizer 30 monitors the detection value of the load sensor 40. When the detection value of the load sensor 40 reaches a threshold value Nth shown in FIG. 8, the controller 42 stops pressurization by the pressurizer 30. The threshold value Nth is set to a value of the load N1 applied to the pressurizer 30 during the rapid increase period T2. Namely, the threshold value Nth is set to a higher value than the load N1 applied at the bending point P1. Thus, at the time when the controller 42 stops pressurization (namely, at the time when the load N1 reaches the threshold value Nth), the adhesive 20*a* and the adhesive 20*b* are in contact with each other as shown in FIG. 6 and FIG. 7. Thus, it is possible to surely make the adhesive 20*a* and the adhesive 20*b* contact with each other, by stopping the pressurization after the time of transition from the curvilinear increase period T1 to the rapid increase period T2. Then, the adhesive 20 is cured while a condition where the battery pack 12 and the cooler 16 are sandwiched by the pressurizer 30 is maintained. With the adhesive 20 thus cured, the battery pack 12 is bonded to the cooler 16. In this manner, the module of the battery pack 12 and the cooler 16 is completed.

As described above, in the manufacturing method of the first embodiment, a value of the load N1 in the rapid increase period T2 is set as the threshold value Nth, and the pressurization is stopped when the detection value of the load sensor 40 reaches the threshold value Nth. Accordingly, the adhesive 20*a* in the application area 21*a* and the adhesive 20*b* in the application area 21*b* can be surely brought into contact with each other. During the pressurization process and after the pressurization process, it is impossible to visually determine whether the adhesive 20*a* and the adhesive 20*b* are in contact with each other. However, according to the above manufacturing method, it is possible to surely make the adhesive 20*a* and the adhesive 20*b* in contact with each other, without the need to visually check the adhesives 20*a*, 20*b*. Accordingly, with this manufacturing method, the gap 22 can be prevented from remaining between the adhesive 20*a* and the adhesive 20*b*, and shortage of the adhesive strength can be prevented.

The cross-sectional area S1 of the adhesive 20 before compression is the sum of the cross-sectional area of the adhesive 20*a* and that of the adhesive 20*b*. Where R denotes the diameter of the cross section of each adhesive 20a, 20b shown in FIG. 2, the cross-sectional area S1 satisfies the relationship that S1=2×(R/2)². As is apparent from FIG. 6, the cross-sectional area S2 of the adhesive 20 after compression satisfies the relationship that S2=W2×t1. The cross-sectional area S1 of the adhesive 20 before compression is substantially equal to the cross-sectional area S2 of the adhesive 20 after compression. Accordingly, the relationship that R=((4×W2×t1)/(2×π))$^{1/2}$ is established. As is apparent from FIG. 2 and FIG. 6, the distance L1 between the center of the adhesive 20a and the center of the adhesive 20b before compression is substantially equal to a half of the width W2 of the adhesive 20 after compression. Namely, the relationship that L1=W2/2 is established. Accordingly, where W2$t$ denotes the design value of the width W2, and t1$t$ denotes the design value of the thickness t1, the distance L1 and the diameter R at the time of application of the adhesive 20 can be set to satisfy the relationships that L1=W2$t$/2, and R=((4×W2$t$×t1$t$)/(2×π))$^{1/2}$. With the distance L1 and the diameter R set in this manner, the width W2 and thickness t1 of the adhesive 20 at the time when the load N1 rapidly increases (i.e., at the bending point P1) substantially coincide with the width W2$t$ and thickness t1$t$ as designed. Accordingly, it is possible to make the width W2 and thickness t1 of the adhesive 20 substantially equal to the width W2$t$ and thickness t1$t$ as designed, by stopping the pressurization by the pressurizer 30 immediately after the transition from the curvilinear increase period T1 to the rapid increase period T2 as in the first embodiment. Thus, according to the manufacturing method of the first embodiment, the width W2 and thickness t1 of the adhesive 20 after compression can be accurately controlled.

Figure 9:
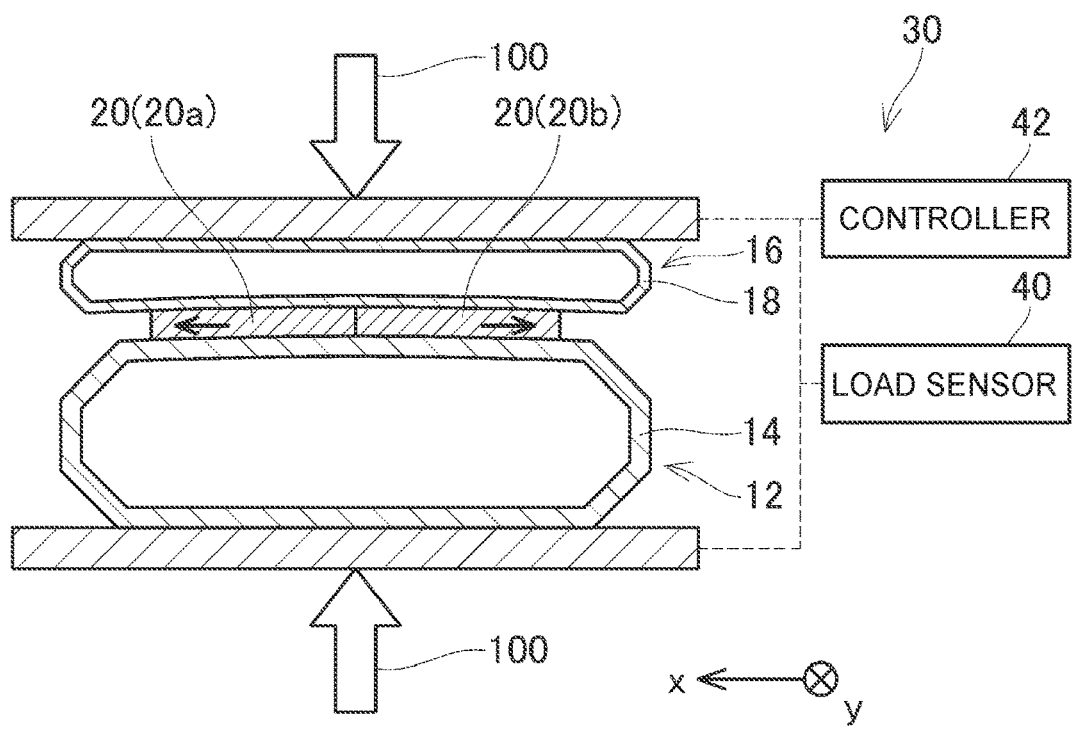
FIG. 9 is a cross-sectional view showing the compression process.

In the first embodiment, the stiffness of the case 14 of the battery pack 12 is higher than that of the outer wall 18 of the cooler 16. Thus, concentration of the load in the pressurization process and shortage of the adhesive strength can be prevented. Namely, while the case 14 is designed to have flat surfaces, the surface of the case 14 may be slightly distorted (e.g., warped) as shown in FIG. 9. In this case, the outer wall 18 of the cooler 16 elastically deforms in accordance with the shape of the case 14 as shown in FIG. 9 in the pressurization process, since the stiffness of the outer wall 18 of the cooler 16 is lower than that of the case 14. Thus, even in the case where the surface of the case 14 is distorted, high load can be prevented from being locally applied to a part of the case 14 and a part of the outer wall 18. When the adhesive 20 is cured under this condition, the outer wall 18 is fixed in a deflected state to the case 14 because the adhesive strength of the adhesive 20 is stronger than the force with which the outer wall 18 tries to return to its original shape. Thus, the outer wall 18 is fixed in the shape that conforms to distortion of the case 14, so that the cooler 16 can be fixed to the case 14 with high strength.

In the first embodiment, the ceramic powder is dispersed within the adhesive 20; therefore, the adhesive 20 has a high thermal conductivity. Accordingly, the battery pack 12 can be efficiently cooled by the cooler 16.

In the first embodiment, a value of the load N1 during the rapid increase period T2 is set as the threshold value Nth, and the rapid increase period T2 is detected by checking whether the detection value of the load sensor 40 reaches the threshold value Nth. However, the rapid increase period T2 may be detected by another method. For example, the rate of increase of the load N1 may be calculated from the detection value of the load sensor 40, and the rapid increase period T2 may be detected based on the rate of increase of the load N1.

Second Embodiment

Figure 10:
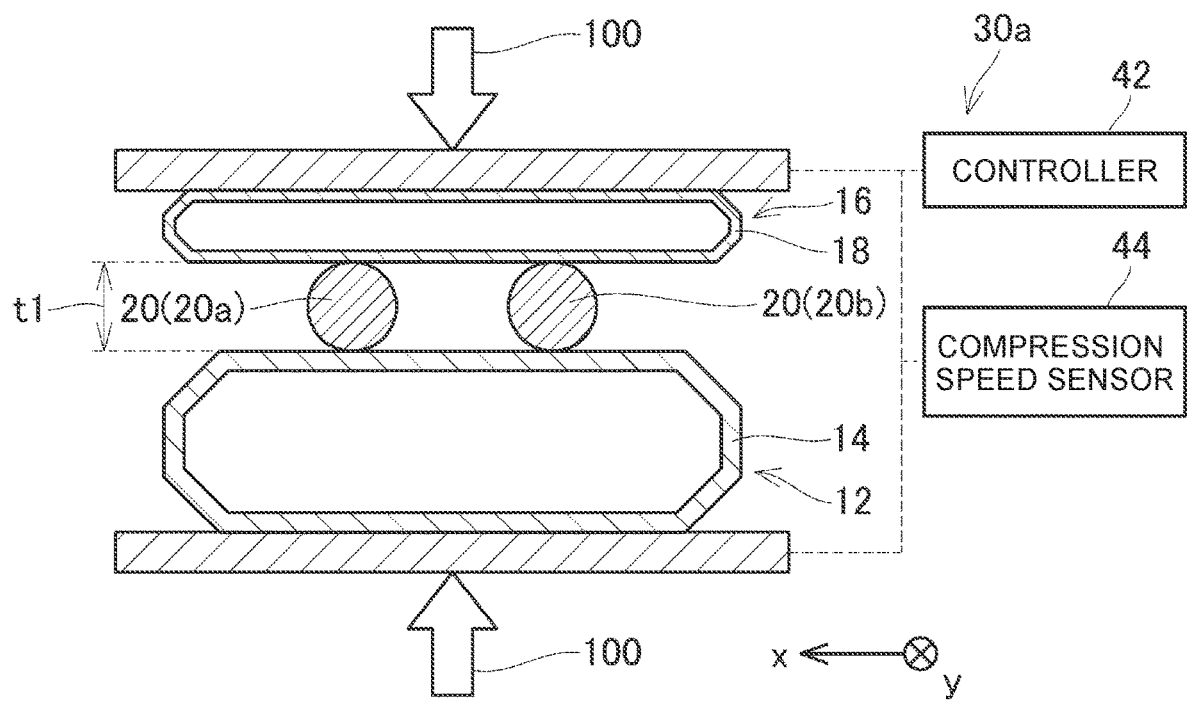
FIG. 10 is a cross-sectional view showing the compression process.

Next, a manufacturing method of a second embodiment will be described. In the manufacturing method of the second embodiment, too, the adhesive application process and the component placement process are performed in the same manner as in the first embodiment. In the second embodiment, the pressurization process is performed by using a pressurizer 30a shown in FIG. 10. The pressurizer 30a of FIG. 10 has a compression speed sensor 44 in place of the load sensor 40. The other configuration of the pressurizer 30a of FIG. 10 is identical with that of the pressurizer 30 of FIG. 4. The compression speed sensor 44 detects the compression speed V1 of the adhesive 20 in the pressurization process. The compression speed V1 is equal to the rate of reduction dt1/dt of the thickness t1 of the adhesive 20. In the pressurization process of the second embodiment, the pressurizer 30 compresses the adhesive 20 in such a manner that the compression speed V1 can be changed. For example, the pressurizer 30 compresses the adhesive 20 at a constant work rate or at a constant load. Thus, during the pressurization process, the compression speed V1 changes.

Figure 11:
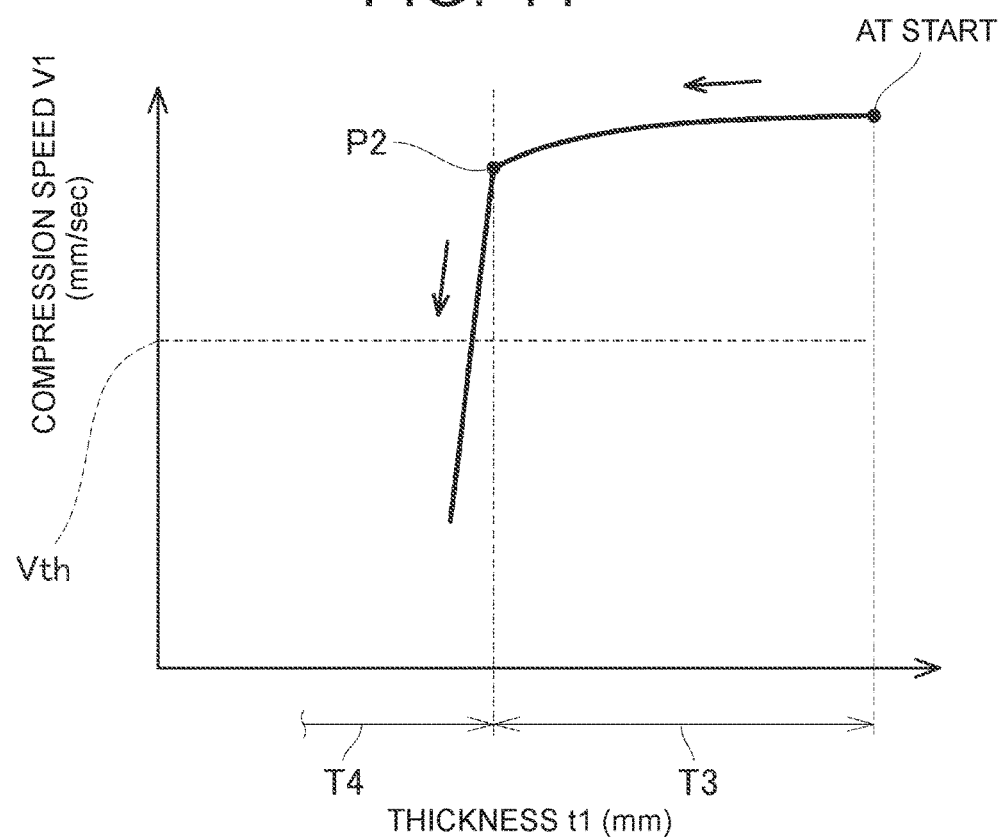
FIG. 11 is a graph showing changes in the compression speed in the compression process.

FIG. 11 shows changes in the compression speed V1 during the compression process of the second embodiment. As shown in FIG. 11, the compression speed V1 at the start of the pressurization process is high. As the thickness t1 of the adhesive 20a, 20b decreases, the width W1 expands, and the load required to expand the W1 increases. Thus, immediately after the start of the pressurization process, the compression speed V1 decreases slowly in a curved line as the thickness t1 of the adhesive 20 decreases. Then, when the adhesive 20a and the adhesive 20b contact with each other, the adhesives 20a, 20b stop flowing in the x direction at the contact position. Thus, after that, the load required to expand the width W2 of the adhesive 20 rapidly increases. As a result, the compression speed V1 rapidly drops from the bending point P2 as shown in FIG. 11. In particular, the adhesive 20 has the thixotropic properties; therefore, the compression speed V1 drops extremely steeply from the bending point P2. In the following description, the period in which the compression speed V1 decreases slowly in a curved line will be referred to as "curvilinear decrease period T3", and the period in which the compression speed V1 decreases rapidly will be referred to as "rapid decrease period T4". In the rapid decrease period T4, the compression speed V1 decreases in a polygonal line with respect to the trajectory of the compression speed V1 in the curvilinear decrease period T3.

During the pressurization process, the controller 42 of the pressurizer 30 monitors the detection value of the compression speed sensor 44. When the detection value of the compression speed sensor 44 decreases to a threshold value Vth shown in FIG. 11, the controller 42 stops pressurization by the pressurizer 30. The threshold value Vth is set to a value of the compression speed V1 during the rapid decrease period T4. Namely, the threshold value Vth is set to a lower value than the compression speed V1 at the bending point P2. Thus, at the time when the controller 42 stops pressurization (namely, at the time when the compression speed V1 decreases to the threshold value Vth), the adhesive 20a and the adhesive 20b are in contact with each other. Thus, it is possible to surely make the adhesive 20a and the adhesive 20b in contact with each other, by stopping the pressurization after the time of transition from the curvilinear decrease period T3 to the rapid decrease period T4. Then, the adhesive 20 is cured so that the case 14 is bonded to the cooler 16. In this manner, the module of the battery pack 12 and the cooler 16 is completed.

As described above, in the manufacturing method of the second embodiment, too, the adhesive 20a and the adhesive 20b can be surely brought into contact with each other. In the second embodiment, a value of the compression speed V1 during the rapid decrease period T4 is set as the threshold value Vth, and the rapid decrease period T4 is detected by checking whether the detection value of the compression speed sensor 44 is reduced to the threshold value Vth. However, the rapid decrease period T4 may be detected by another method. For example, the rate of reduction dV1/dt of the compression speed V1 may be calculated from the detection value of the compression speed sensor 44, and the rapid decrease period T4 may be detected based on the rate of reduction dV1/dt.

Figure 12:
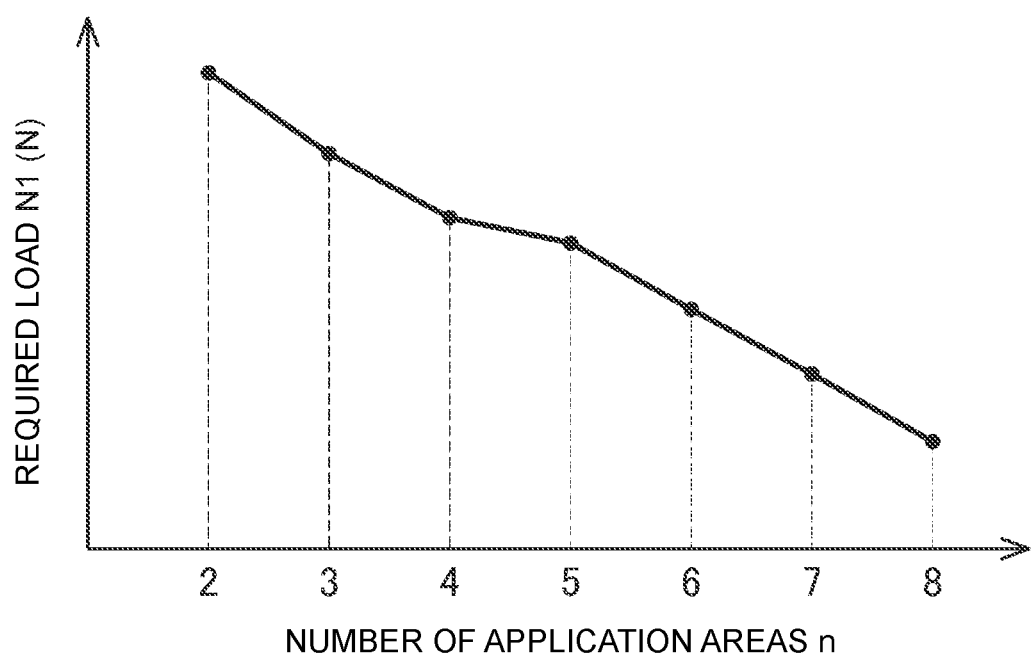
FIG. 12 is a graph showing the relationship between the number of application areas and the load required during compression.

In the first and second embodiments, the adhesive 20 is applied to the two application areas 21a, 21b. However, the adhesive 20 may be distributed and applied to three or more application areas. FIG. 12 shows the value of the load N1 required to expand the adhesive 20 using the pressurizer over the same range as that of the first and second embodiments. In FIG. 12, the results of measurement of the required load N1 while the number "n" of the application areas is changed are indicated. As shown in FIG. 12, the required load N1 can be reduced as the number "n" of the application areas increases. When the number of the application areas is larger than two, the distance L1 and diameter R of the adhesives 20 when applied can be set to satisfy the relationships that $L1=W2t/n$, and $R=((4 \times W2t \times t1t)/(n \times \pi))^{1/2}$, and the thickness t1 and width W2 of the adhesive 20 after compression can be accurately controlled to the design values.

While the embodiments have been described in detail, these embodiments are merely exemplary, and do not limit the appended claims. The technologies described in the claims include those obtained by modifying or changing the illustrated specific examples in various ways. The technical elements described in the specification or drawings exhibit the technical usefulness alone or in various combinations, and are not limited to the combinations described in the claims as filed. The technologies illustrated in the specification or drawings achieve two or more objects at the same time, and have the technical usefulness if they achieve one of the objects.

What is claimed is:

1. A method of manufacturing adhered components, comprising:
    a first process of applying an adhesive to a plurality of application areas on a surface of a first component, the application areas extending linearly and being spaced in a direction intersecting an extending direction in which the application areas extend linearly;
    a second process of placing a second component above the first component such that the adhesive is sandwiched between the first component and the second component; and
    a third process of compressing the adhesive by pressurizing the second component toward the first component with a pressurizer,
    wherein, in the third process, a load applied to the pressurizer changes such that the load goes through a curvilinear increase period and a rapid increase period in an order of description, the curvilinear increase period being a period in which the load increases in a curved line as an amount of compression of the adhesive increases, the rapid increase period being a period in which the load increases in a polygonal line with respect to a trajectory of the load in the curvilinear increase period as the amount of compression of the adhesive increases, and
    wherein the third process includes performing pressurization by the pressurizer while detecting the load by a load sensor, detecting the rapid increase period based on a detection value of the load sensor, and stopping the pressurization by the pressurizer during the rapid increase period.

2. The method according to claim 1, wherein:
    in the third process, the pressurization by the pressurizer is stopped when the detection value of the load sensor reaches a threshold value; and
    the threshold value is set to a value of the load during the rapid increase period.

3. The method according to claim 1, wherein the adhesive has thixotropic properties.

4. The method according to claim 1, wherein:
    the first component is a battery pack; and
    the second component is a cooler.

5. The method according to claim 1, wherein a stiffness of one of the first component and the second component is lower than the stiffness of the other of the first component and the second component.

6. The method according to claim 1, wherein ceramic powder is dispersed in the adhesive.

7. A method of manufacturing adhered components, comprising:
    a first process of applying an adhesive to a plurality of application areas on a surface of a first component, the application areas extending linearly and being spaced in a direction intersecting an extending direction in which the application areas extend linearly;
    a second process of placing a second component above the first component such that the adhesive is sandwiched between the first component and the second component; and
    a third process of compressing the adhesive by pressurizing the second component toward the first component with a pressurizer,
    wherein, in the third process, a compression speed of the adhesive changes such that the compression speed goes through a curvilinear decrease period and a rapid decrease period in an order of description, the curvilinear decrease period being a period in which the compression speed decreases in a curved line as an amount of compression of the adhesive increases, the rapid decrease period being a period in which the compression speed decreases in a polygonal line with respect to a trajectory of the compression speed in the curvilinear decrease period as the amount of compression of the adhesive increases, and
    wherein the third process includes performing pressurization by the pressurizer while detecting the compression speed by a compression speed sensor, detecting the rapid decrease period based on a detection value of the compression speed sensor, and stopping the pressurization by the pressurizer during the rapid decrease period.

8. A method of manufacturing adhered components, comprising:
    a first process of placing an adhesive on a plurality of application areas extending linearly and spaced in a direction intersecting an extending direction in which the application areas extend linearly, between a first component and a second component; and a second process of compressing the adhesive by pressurizing the adhesive between the second component and the first component with a pressurizer, wherein, in the second process, a load applied to the pressurizer changes such that the load goes through a first increase period and a second increase period in an order of description, the first increase period being a period in which the load increases as an amount of compression of the adhesive increases, the second increase period being a period in which (i) the load increases in a polygonal line with respect to a trajectory of the load in the first increase period as the amount of compression of the adhesive increases, and (ii) a rate of increase of the load is higher than the rate of increase of the load in the first increase period, and wherein the second process includes performing pressurization by the pressurizer while detecting the load by a load sensor, detecting the second increase period based on a detection value of the load sensor, and stopping the pressurization by the pressurizer during the second increase period.

9. A method of manufacturing adhered components, comprising:

a first process of placing an adhesive on a plurality of application areas extending linearly and spaced in a direction intersecting an extending direction in which the application areas extend linearly, between a first component and a second component; and a second process of compressing the adhesive by pressurizing the adhesive between the second component and the first component with a pressurizer, wherein, in the second process, a compression speed of the adhesive changes such that the compression speed goes through a first decrease period and a second decrease period in an order of description, the first decrease period being a period in which the compression speed decreases as an amount of compression of the adhesive increases, the second decrease period being a period in which (i) the compression speed decreases in a polygonal line with respect to a trajectory of the compression speed in the first decrease period as the amount of compression of the adhesive increases, and (ii) a rate of decrease of the compression speed of the adhesive is higher than the rate of decrease of the compression speed of the adhesive in the first decrease period, and wherein the second process includes performing pressurization by the pressurizer while detecting the compression speed by a compression speed sensor, detecting the second decrease period based on a detection value of the compression speed sensor, and stopping the pressurization by the pressurizer during the second decrease period.

* * * * *